INVENTOR.
CHESTER W. NEWELL
BY
Fleher and Swain
ATTORNEYS

INVENTOR.
CHESTER W. NEWELL
BY
Flehr and Swain
ATTORNEYS

INVENTOR.
CHESTER W. NEWELL
BY
Flehr and Swain
ATTORNEYS

United States Patent Office 3,487,175

Patented Dec. 30, 1969

3,487,175

REVERSIBLE TAPE TRANSPORT WITH INCREASED TAPE PRESSURE AT HIGH RATES OF CHANGES IN SPEED

Chester W. Newell, San Jose, Calif., assignor to Newell Associates, Inc., Sunnyvale, Calif., a corporation of California Filed Oct. 7, 1966, Ser. No. 585,010

Int. Cl. G11b *5/00, 15/44*

U.S. Cl. 179—100.1 5 Claims

ABSTRACT OF THE DISCLOSURE

A tape transport for feeding a length of tape between supply and take-up rolls to provide a continuous, substantially uninterrupted program played from tracks extending along the tape wherein the tracks are successively transduced by feeding the tape in opposite directions. Means rapidly decelerating, reversing, and accelerating the tape, for making the transition between transducing the tape in one direction and an opposite direction provides a substantially uninterrupted program as regards the ear or eye of the observer. Supply and take-up rolls are pressed to ride against a resilient drive capstan. During the high rates of change in tape speed, the rolls are pressed with greater force against the capstan than otherwise.

This invention discloses an improvement in the general field of feeding pliant filaments such as magnetic recording tapes and photographic films (all referred to hereinafter as tapes). More particularly, this invention pertains to such apparatus wherein tapes are fed in a manner requiring high acceleration, deceleration, or both; for example, as where such filaments are fed from one roll to the other and then fed in a reverse direction. This invention pertains, further, to the method of and record produced by, the disclosed manipulation of the tape.

As related to the equipment shown in co-pending application Ser. No. 480,324 (now U.S. Letters Patent No. 3,370,803) the preferred apparatus as disclosed herein provides a tape transport of a type wherein the tape is fed in the direction of its length and information indicia such as recorded signals are applied to the tape along paths extending longitudinally of the tape. The preferred system is so quickly reversible that a continuous substantially uninterrupted program can be recorded and reproduced although comprised of program portions applied successively to a plurality of adjacent record paths, as where the first record path must be transduced by feeding the tape in one direction and the next path transduced by feeding the tape in an opposite direction.

In general, it is an object of this invention to provide an improved tape transport apparatus; method of handling tape; and tape record produced thereby.

When a program, such as a musical composition or other program is recorded upon magnetic recording tape along a path extending longitudinally of the tape, the length of tape required and hence the size of the roll of tape, has been governed by the length of the program being recorded. Accordingly, for short programs, the size of the roll of tape may not be objectionable. The problem, however, becomes particularly objectionable, for example, where video signals for TV programs are recorded in longitudinal paths on tape for the reason that in order to reach video frequencies, the tape must be fed past a transducer at something on the order of at least 100 to 150 inches per second and preferably at speeds of 240 to 625 i.p.s. Thus, for an uninterrupted 30-minute television program, an unmanageably large roll of tape is required.

As disclosed herein, however, there is provided a preferred system wherein the required length of tape is radically reduced while presenting a relatively long uninterrupted program. Accordingly, a television program can be recorded in a number of longitudinally extending paths arranged side by side, and at the end of each path the tape is reversed within a time period compatible with the image retention period or persistency of the image in the eye of the observer whereby the continuity of the program, as it appears to the audience, is unaffected.

Thus, by quickly reversing the tape movement and by recording the program substantially continuously even while the tape is being reversed, the particular human sense which is affected by the program, i.e., either the ear or eye, will find no objectionable discontinuity in the presentation of the program.

Accordingly, it is an object of the invention to provide a program which is continuously recorded in oppositely extending record paths on the same medium, and wherein the start of the second portion of the program and the end of the first portion of the program are sufficiently close in time to provide a continuous program substantially uninterrupted as noted by the human senses.

In order to reverse the tape quickly without doing damage to it or otherwise disrupting the smooth flow of tape, it has been found necessary to maintain the tape under positive control during the rapid deceleration or acceleration thereof during reversal. Accordingly, it is another object of the invention to provide a tape transport system wherein during rapid changes in speed of the tape movement, it will be handled under positive control of the transporting apparatus in the interest of protecting the tape from damage.

It is a further object of the invention to provide a tape transport apparatus having improved means for sensing the imminent transfer from the supply roll to the take-up roll, or vice versa, of a predetermined portion of the tape, most usually the end of the tape.

It is a more particular object of the invention to provide a tape transport system wherein the required length of tape at each end of the roll necessary for purposes of accommodating deceleration, reversal and acceleration of the tape during reversals thereof, can be of minimal extent and rather closely defined by adjustable mechanical sensing means.

The moment for the initiation of reversal during playback is represented as a recorded control signal applied to the tape when the tape is recorded. Thus, the required length of tape at each end of the roll necessary to effect reversal, without running out of tape, will be accurately defined and established and be independent of the playback apparatus used.

By preserving sufficient tape at each end of the roll whereby the end of the tape will not be transferred from the roll, the transducer will always cooperate with tape.

Thus, during reversal, objectionable spurious signals will not be introduced as might be occasioned if the transducer were to momentarily cooperate directly with the moving capstan surface which lies behind and supports the tape during feeding thereof. This is important since the eye or ear will tolerate momentary changes in the quality of signals being reproduced from the tape but will not tolerate the introduction of spurious signals into the program.

Thus, it is highly desirable and becomes another object of this invention to sense the imminent prospective transfer of the end of the tape from the supply roll in time to reverse the tape in order that the end of the tape does not pass out from under the transducer.

These and other objects of the invention will become more clearly apparent from the following detailed description of a preferred embodiment when considered in conjunction with the accompanying drawings in which.

In general, according to the preferred arrangement shown and embodied in apparatus as disclosed in the above referenced co-pending application there is provided a tape transport system of a type adapted to support a length of pliable recording tape wrapped to form supply and take-up rolls. The rolls are rotatably supported and reversible drive means is adapted to feed tape. Transducer means are disposed to cooperate with the tape.

In order to control the reversing of the tape at appropriate times, there is discolsed means for sensing the imminent transfer of a predetermined portion of the tape, such as the end of the tape, from the supply roll and, responsive thereto, reversing means serve to reverse the drive means to thereby reverse the tape movement. Reversal of tape movement occurs within a period not substantially exceeding one second and occurs prior to the transfer from the supply roll of an end or other predetermined portion of the tape. The transducer is conditioned in response to the sensing means to cooperate with another longitudinally extending track of the recording tape during the reverse or return transfer of the tape.

It has been found that in order to limit the period of time required for reversal to a period not objectionable to the human senses when the program is reproduced, and without harm to the tape, in a more particular construction of the foregoing arrangement wherein a capstan or other rotatable annular means is disposed in edge driving contact relation to the supply and take-up rolls, the points of contact of the capstan with the supply and take-up rolls must be subjected to a temporary increase in the compressive edge driving contact forces applied.

Figure 1:
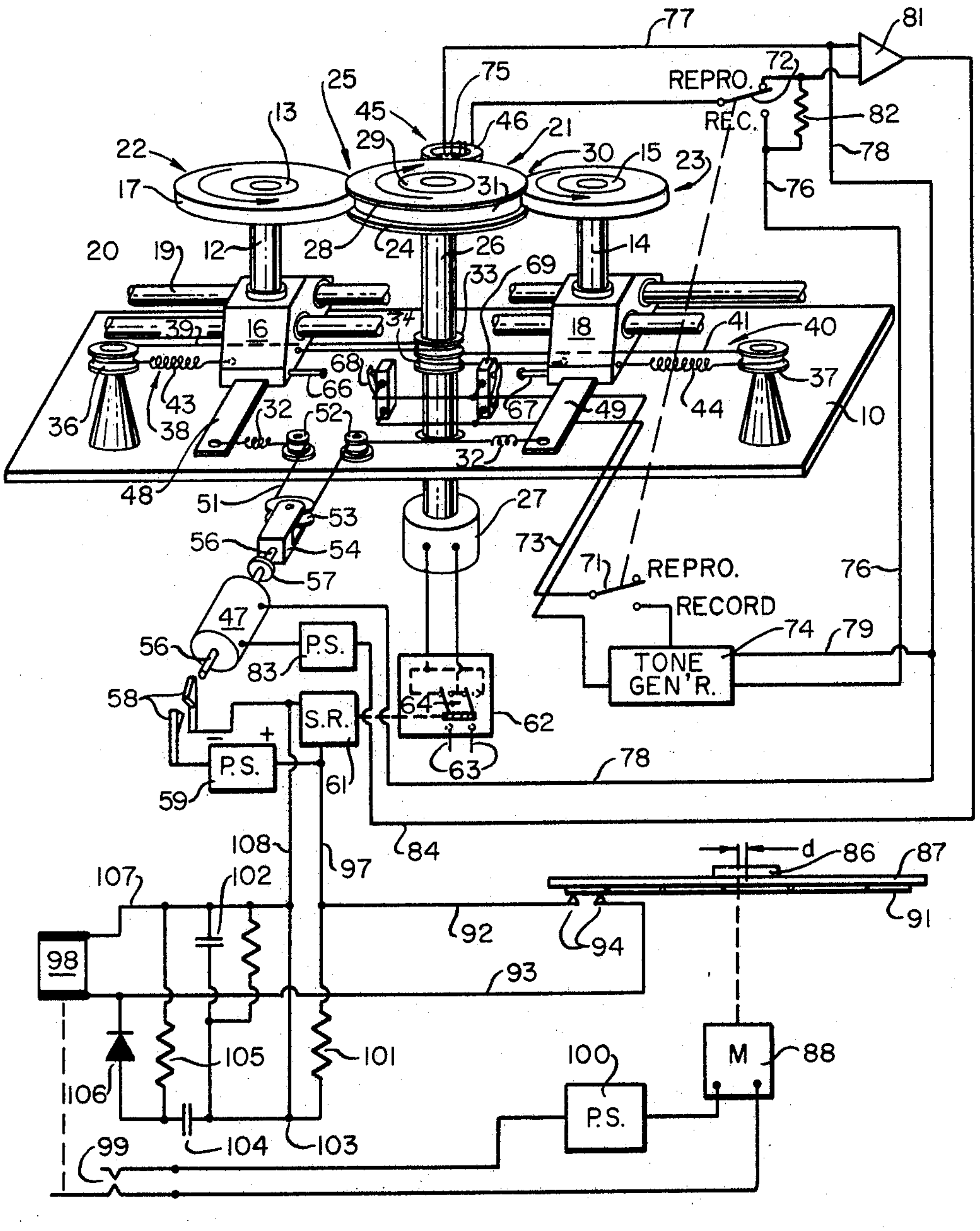
FIGURE 1 is a schematic view, in perspective, according to the invention.
Figures 2, 3:
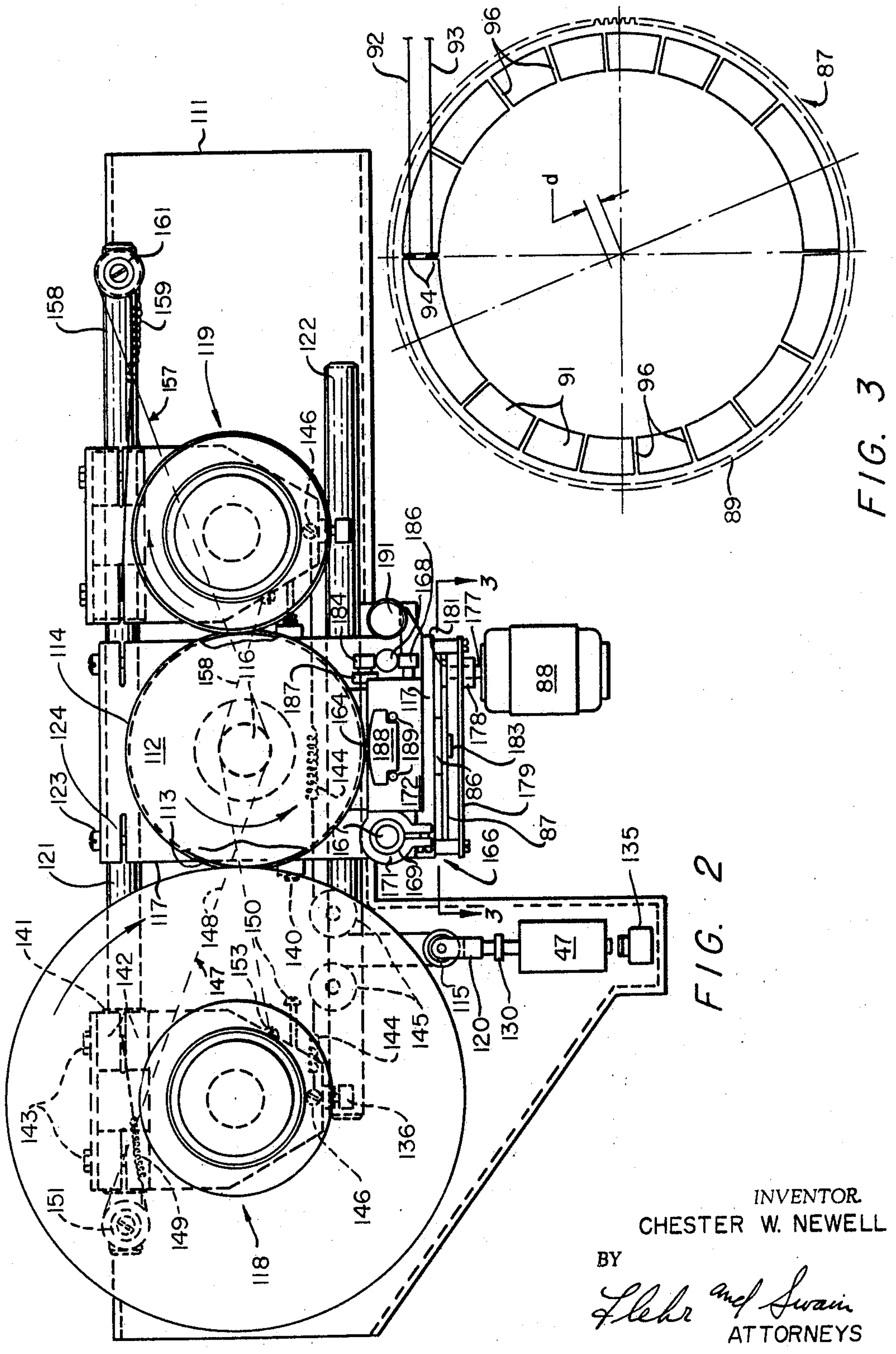
FIGURE 2 is a plan view of tape transport apparatus according to the invention.
FIGURE 3 is an enlarged view of a commutator disc element employed in the system.
Figure 4:
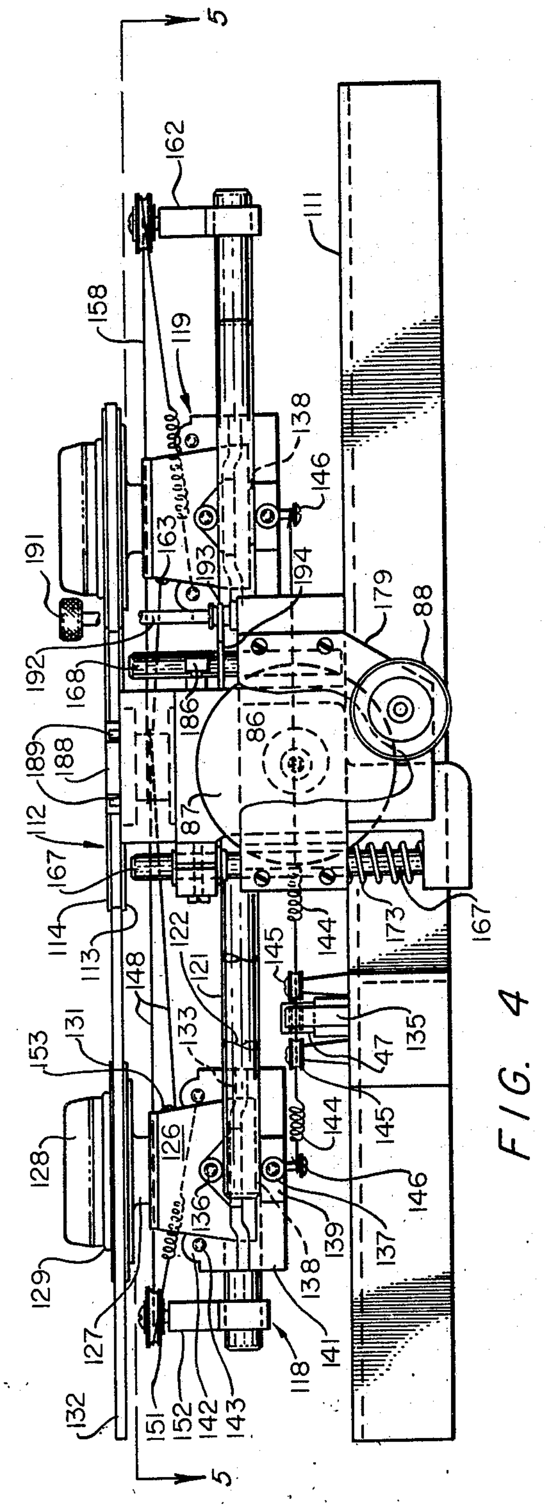
FIGURE 4 is an elevation view of FIGURE 2.
Figure 5:
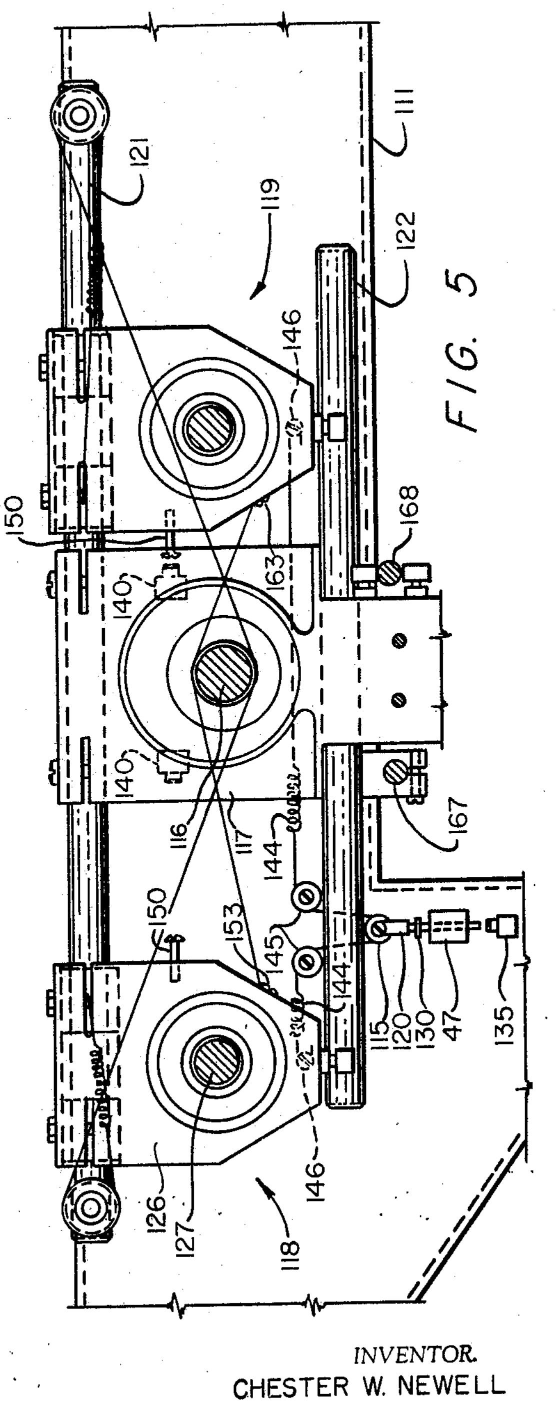
FIGURE 5 is a plan view of apparatus shown in FIGURE 4 taken along the line 5—5 thereof.

The foregoing preferred embodimment shall be described in more particular detail by referring to the schematic arrangement shown in FIGURE 1.

TAPE TRANSPORT STRUCTURE

Means are provided forming a base or frame such as the platform 10. A pair of spindles 12, 14 support supply and take-up hubs 13, 15 respectively, which are mounted for independent rotation. A length of conventional pliable plastic base recording tape 17 is formed upon hub 13 for feeding to hub 15 and return. As shown in FIGURE 1, tape 17 has been partially wound about take-up hub 15. Spindles 12 and 14 are mounted for movement along a predetermined line of travel whereby the periphery of the supply and take-up rolls 22, 23 can be maintained in continuous contact with a drive capstan assembly 21 notwithstanding progressively changing diameters of the rolls during tape transfer.

Spindles 12, 14 are respectively journalled in a pair of traveling carriages 16, 18. Carriages 16, 18 are supported to move on roller bearings (not shown) along a pair of ways defined by stationary rods 19, 20. Frame means (not shown) are provided in actuality to support rods 19, 20 from the platform 10.

Drive capstan assembly 21 is interposed between supply roll 22 and take-up roll 23 to drive both rolls by peripheral engagement. Capstan assembly 21 includes a resilient peripheral drum surface 31 bounded by flanges 24, 28. Flange 24 is fixed for rotation with the drive shaft 26 driven by a reversible motor 27. Flange 28 is also supported for rotation with shaft 26 and is preferably spring loaded for limited movement toward flange 24. A circular diaphragm spring 29 serves to urge flange 28 toward flange 24 whereby opposed flanges continuously engage opposite edges of the tape. Thus, the confronting surfaces of flanges 24, 28 are spaced to receive and engage the opposite edges of tape 17 therebetween.

Tape is transferred from a supply roll into a transducing zone and then onto a take-up roll. Thus, as shown in FIGURE 1, tape from supply roll 22 transfers onto the peripheral drum surface 31 of capstan assembly 21 at the point of departure 25 of tape 17 from supply roll 22; makes facial contact with drum surface 31; and then is carried to the point of tape arrival 30 upon take-up roll 23. The tape edges of the outermost plurality of convolutions register with the inner faces of flanges 24, 28 in predetermined planes at the point of transfer onto capstan assembly 21.

It is to be appreciated that the point of tape departure 25 from the "supply" roll and point of tape arrival 30 at the "take-up" roll are designated only after the direction of rotation of capstan 21 is known. In FIGURE 1 directional arrows have therefore been applied. However, it will be apparent that operation of capstan 21 in a reverse mode will cause the points of departure and arrival as designated in FIGURE 1 to be reversed and that for each successive tape transfer operation these points as designated will alternate as will the designation of the rolls as "supply" and "take-up" rolls. The following description, however, will proceed on the assumed direction of rotation shown by the applied arrows in FIGURE 1.

Means are provided which are active during transfer of a complete roll of tape which serve to develop a compressive force between supply roll 22 and capstan assembly 21 at the point of tape departure 25 and also between take-up roll 23 and capstan 21 at the point of arrival 30. The compressive force developed at the point of arrival is greater than at the point of departure.

The foregoing means is inherently and naturally reversible in response to a change in direction of motor 27 thereby simplifying control thereof. Thus (as schematically shown in FIGURE 1), a "bias" spring 32 is coupled to draw both the supply and take-up rolls 22, 23 equally into engagement with surface 31. In order to develop a greater compressive force at the point of tape arrival 30 onto the take-up roll 23, friction means such as represented by devices as now to be described are employed.

A pair of pulleys 33, 34 are mounted for rotation with shaft 26. Another pair of pulleys 36, 37 are disposed upon platform 10 in fixed positions. A pair of tensioned slip bands 38, 40 (each respectively including a strand 39, 41 and spring 43, 44), are trained respectively about pulleys 33, 36 and 34, 37. Both ends of each band 38, 40 are attached to an associated one of carriages 16, 18. Strand 39 is led around pulley 33 in a direction common to the direction of rotation of pulley 33 when supplying tape from roll 22 to roll 23 as shown. By weaving strand 39 in this manner about pulley 33, clockwise rotation of shaft 26 imparts a tendency to develop slight to modest slack in that reach of strand 39 extending between carriage 16 and pulley 33. Strand 41 is trained about pulley 37 and is led about pulley 34 in a counter-clockwise direction, so that reach of strand 41 extending between pulley 34 and carriage 18 tends to develop a slight to modest additional tautness.

From the foregoing, it will be evident that the tendency toward slack which develops in slip band 38 and the increased tension developed in slip band 40 serves to combine with the equalized compression action of "bias" spring 32 to apply different compressive forces as between the point of tape departure 25 from supply roll 22 and the point of tape arrival 30 at a take-up roll 23.

Thus, it is apparent that shaft 26 with its pulley 33, 34 and tensioned bands 38, 40 form slip drive means which introduces a force component tending naturally and inherently to move both carriages 16, 18 in a direction opposite to the direction of tape travel and in a manner which is naturally reversed upon reversal of tape movement without further controls or apparatus. In this way, the action of the slip band of the "supply" roll serves always to apply a component of force tending to urge the "supply" roll away from the capstan drum surface 31 while the action of the slip band of the "take-up" roll is always to apply a component of force tending to urge the "take-up" roll toward the drum surface 31. These force components, in conjunction with the "bias" spring 32, serve to develop suitable pressure at the points of departure 25 and arrival 30.

As shown in FIGURE 1, as capstan assembly 21 continues to rotate in a clockwise direction, tape is fed from supply roll 22 to pick-up roll 23. In order to maintain continuous facial contact with drum surface 31, the traveling carriages 16, 18 and translation guide means such as rods 19, 20 accommodate changes in roll diameter.

During translation of carriages 16, 18, bands 38, 40 will advance and retreat about their respective pulleys substantially without elongating the springs 43, 44 disposed therein respectively. As one end of band 38, for example, pays out, the other end is being taken in.

Springs 43, 44 serve to retain their respective bands in position upon the pulleys with a constant tension and determine the value of the difference in compressive forces applied respectively at the points of departure and arrival. It is preferred that springs 43, 44 have equivalent force characteristics whereby the compressive force differential is inherently reversible for bi-directional operation.

The force applied by bias spring 32 would, of course, be algebraically added to the differential forces in determining the value of the force applied at points 25, 30.

A magnetic recording transducer head assembly 45 is shown positioned to cooperate with the recording tape 17 as it passes around capstan assembly 21. Assembly 45 includes the usual core 46 and a "write" or record winding 75. By registering the tape edge with the surface of flange 24, assembly 45 can be laterally registered accurately with a given recording track formed along tape 17 thereby permitting recording to be accurately pursued along closely adjacent longitudinal tracks.

TAPE REVERSING MECHANISM

Means are provided for quickly reversing the tape movement while maintaining the tape under positive control. Thus, it has been found that if the capstan assembly 21 is merely quickly reversed, tape can be damaged if steps are not taken, by virtue of the fact that the supply roll will, through its momentum, tend to continue to feed tape in the previous direction. Inasmuch as the capstan is now operating in a reverse direction, the tape remaining on the supply roll will form a loop ultimately resulting in the production of a large quantity of free tape which can become tangled or otherwise loosely distributed. At the same time, the momentum in the take-up roll will also cause it to continue to rotate in the preceding direction and the reverse rotation of the drive capstan can serve to tug at the tape in an opposite direction when attempting to reverse the feed. Such tugging tends to elongate and damage the tape. Thus, errors in the recorded signals will be introduced.

Accordingly, immediately prior to reversing capstan assembly 21, the compressive forces are temporarily increased between the supply roll and capstan at the point of tape departure 25 and between the take-up roll and capstan at the point of tape arrival 30. The level to which these compressive forces is raised is that level sufficient to form appropriate friction between the tape surfaces and capstan drum surface 31 on one side and the adjacent convolution of tape on the other side of the tape whereby capstan assembly 21 can transfer a reverse driving torque to spindles 12, 14 without significant slippage either between surface 31 and the adjacent tape surface or between the rolls and tape surfaces.

Essentially, in the embodiment shown, this temporary increase in the compressive forces is effected by energizing at a proper time a solenoid 47 arranged to apply a tug to the bias spring 32. (As schematically shown, bias spring 32 includes two springs joined by an intermediate strand 51.) Thus, the opposite ends of bias spring 32 are secured to ears 48, 49 supported by carriages 16, 18, respectively. Intermediate strand 51 is trained about a pair of stationary pulleys 52 to form a bridle drawn by a pulley 53 carried on an armature extension 54. Thus, as the armature 56 is drawn into the core of solenoid 47, a tug will be applied and transmitted evenly to both ends of bias spring 32. The inward travel of armature 56 is limited by a fixed stop 57 carried thereon.

Means whereby capstan assembly 21 reverses only after full pressure has been built up at the points of departure 25 and arrival 30 includes a pair of contacts 58 disposed to be moved by the inner end of armature 56. When solenoid 47 is substantially fully activated, contacts 58 close and remain closed during that period wherein solenoid 47 remains energized.

Closure of contacts 58 couples a power supply 59 to operate a stepping relay 61. Relay 61 switches the motor reversing control 62 thereby reversing the leads to motor 27. Relay 61 is of the type wherein each energization thereof serves to reverse its function. As shown in FIGURE 1, therefore, where motor 27 takes power from leads 63, each reversal of the double-throw double-pole switch 64 effected by relay 61 serves to reverse the operation of motor 27.

From the foregoing, it is apparent that solenoid 47 ensures application of a temporarily increased compressive force applied between the capstan and associated rolls at a moment prior to operating the motor reversal control. Thus, when motor 27 is reversed, capstan 21 operates upon rolls 22, 23 to apply a reverse torque to each through increased frictional engagement therebetween.

REVERSING CONTROL

According to a preferred embodiment of the system herein, the tape is fed alternately between rolls 22, 23 whereby signals representing a program being recorded are applied along a plurality of longitudinally extending record paths. Between each reversal the transducer assembly 45 is conditioned as will be explained further below whereby it can cooperate with a reversely extending record path defined along the tape.

Signals representing the program being recorded are applied to the tape to make maximum usage of the tape recording surface. Thus, such signals are recorded throughout substantially the full length of the tape roll. Accordingly, and since it is desirable to avoid introducing objectionable spurious signals into the signals constituting the program, as might develop from permitting the transducer head assembly 45 to cooperate directly with drum surface 31, it is desirable to reverse the tape movement prior to the transfer of the ultimate end of the tape from the supply roll.

Therefore, means are provided for sensing the imminent transfer of a predetermined portion of the tape, usually the ultimate end of the tape, from the supply roll. The foregoing means is arranged for providing rather close control over that length of tape required to effect reverse movement thereof. Further, the mechanical measurement of the exact moment to switch to a reverse mode of operation is memorialized on the recording surface by a control signal applied thereon and which continues throughout the tape reversing period. Thus, when the tape is reproduced and played back, the control signal serves to effect reversal at exactly the same time as was originally determined to be appropriate.

As schematically shown in FIGURE 1, adjustable stops 66, 67 are respectively supported on carriages 16, 18. Stops 66, 67, can, for example, be in the form of screws provided with lock nuts or the like to retain their position once they have been adjusted as desired. Stops 66, 67 are positioned whereby they respectively cooperate with micro-switches 68, 69 and close same at a predetermined point in the lateral translation of carriages 16, 18. By suitably adjusting stops 66, 67, switches 68, 69 can be made to close at a time when the end of the roll of tape is a few convolutions away.

When initially recording each program, the closure of micro-switches 68, 69 initiates a "reversing period" and also serves to apply a control signal to the tape (in the form of a tone) memorializing the exact point on the tape when the reversal period should thereafter be called for during playback. The reversing period as thus initiated includes the action of boosting the compressive forces applied to the tape at its points of contact with capstan 21 and also a reversing of the tape drive to reverse the tape movement. During playback, switches 68, 69 are inactive and the tone from the tape activates the increase in compressive forces and initiates reversal of the tape drive.

In the present preferred embodiment this point is adjustably defined as that point in the travel of carriages 16 or 18 at which reversal of the drive capstan control will be effected. From FIGURE 1, it can be seen that only one of micro-switches 68, 69 will be closed at any one time inasmuch as the movement of one carriage in the direction towards its associated micro-switch is accompanied by movement of the other carriage away from its associated microswitch. Thus, for example, a closure of either micro-switch 68 or 69 will complete the same circuit as now to be described.

If it is first assumed that signals are to be recorded upon the tape, then switches 71, 72 (which are coupled together mechanically) are conditioned to their "record" positions. As thus arranged, when one of microswitches 68, 69 is closed by action of the movement of carriages 16, 18, solenoid 47 will be energized. At the same time, the winding 75 of transducer head assembly 45 will be operated to apply the previously mentioned control signal to the tape.

The foregoing dual function is achieved by a circuit traced, for example, from microswitch 68 along the lead 73 through switch 71 to a tone generator 74. Tone generator 74 can be of conventional design such as, for example, a Hartley oscillator working at 100 kc. The tone generator 74 provides a signal upon lead 76 which is carried through switch 72 (in its "record" position) through the winding 75 of transducer head assembly 45 and then back to the tone generator via lines 77, 78 and connection 79. Thus, by feeding the tone generator signal through head assembly 45 in response to closure of one of microswitches 68, 69, the tone will be recorded upon the tape for the full period in which the microswitch remains closed; namely, for the period that is required to reverse the drive of the tape and maintain reverse travel to a point substantially identical to the point of commencing the tape reversal operation, i.e. until the microswitch 68 or 69 has been reopened.

A switching amplifier 81 of conventional design is arranged to be normally in condition to provide an open circuit at that point. This can be accomplished, of course, by a suitable amplifier biased below cut-off whereby upon receiving a suitable control signal, the amplifier is driven into operation to form a completed circuit.

Closure of one of microswitches 68, 69, as noted above, serves to temporarily boost the compressive force applied to the points of contact of the supply and take-up rolls. This, as explained above, is accomplished generally by energizing solenoid 47.

In order to energize solenoid 47 upon closure of one of microswitches 68, 69, the tone signal on lead 76 is attenuated through suitable means such as resistor 82 and used to bias switching amplifier 81 into conduction thereby completing the following circuit which includes power supply 83. Thus, commencing with power supply 83, the circuit can be traced along line 84 through switching amplifier 81, to leads 77, 78. Lead 78 returns through solenoid 47 to power supply 83.

Accordingly, so long as switching amplifier 81 is in its conductive state, a circuit will exist to maintain solenoid 47 energized. As will be recalled, this action serves to initially raise the compressive forces at the points of contact and subsequently introduces reversal of the drive means.

I have found it desirable to continue to record the program signals upon the tape during the deceleration and acceleration period of tape movement during reversal. However, it is apparent that if the transducer were moved laterally during this time laterally to another track, a spurious signal would be developed which would be noticeable, for example, in video recording, to the eye of the observer.

LATERAL HEAD SHIFTING

In order to avoid introducing such objectionable signals and to permit the tape to be alternately reversed without their appearance in the program, such as discontinuity of the picture, distortion of the picture, etc., it is possible with the apparatus described herein to provide the lateral positioning of the transducer to a new track at that point in the reversal of the tape when the tape is neither decelerating nor accelerating but is intermediate these conditions, hereinafter referred to as the occasion of zero movement of the tape.

Therefore, means are provided for shifting transducer head assembly 45 to cooperate with another of the recording tracks during the reversal operation at a time substantially coincident with zero movement of the tape following termination of forward tape movement and prior to reverse tape movement.

Lateral transfer of head assembly 45 is accomplished in the actual embodiment (FIGURES 2–5) described further below by the means described therein which for present purposes are to be understood as in general including an eccentric 86 mounted to rotate with a commutator disc 87. Disc 87 and eccentric 86, when rotated, serve to laterally transfer head assembly 45. Rotation is effected by a motor 88 when it is energized.

Commutator disc 87 includes a disc of insulating material upon which there are provided sixteen arcuate pads 91 which serve to couple a pair of leads 92, 93 by means of wipers or brushes 94 disposed to ride upon and in the path of pads 91. Between each adjacent pair of pads 91, there is provided an insulated radial spacing whereby leads 92, 93 will be decoupled upon arrival thereat of their associated brushes. The arcuate extent of each pad 91 varies whereby transducer assembly 45 will be laterally moved in equal increments by eccentric 86. Thus, it will be readily apparent that if pads 91 were of equal arcuate extent, the lateral movement of head 45 would be greater during certain portions of the rotation of eccentric 86 than during other portions of its rotational movement.

Activation of the reversal operation, it will be recalled, is effected by the closure of contacts 58. As contacts 58 close, they not only energize stepping relay 61 but also provide rotational movement of disc 87 (and eccentric 86) at an appropriate point in time wherein head 45 will be stepped laterally of the tape while the tape is substantially in a condition of zero movement. Accordingly, a suitable circuit includes power supply 59 and contacts 58. The circuit is traced via lead 97 through a time delay circuit, as will be described below, to operate a relay 98 whereupon a switch 99 serves to energize motor 88 from a power supply 100. By circuitry now to be described, motor 88 is energized in a manner whereby upon arrival of the next subsequent insulated radial spacing 96 of disc 87, it will become de-energized and stop.

Relay 98 is energized from lead 97 through a time delay circuit including resistor 101, and capacitor 102. At the moment when contacts 58 close, the voltage at junction point 103 is established at a level diminished by the voltage drop across resistor 101. The level of the voltage at junction point 103 is then below that necessary voltage for operation of delay 98. However, this voltage gradually rises as capacitor 102 becomes charged. When capacitor 102 has been fully charged, the voltage at junction 103 is seen by one side of relay 98 via capacitor 104 and diode 106. The other side of delay 98 is coupled by line 107 to lead 108 and then via contacts 58 to power supply 59. Accordingly, there will be a limited delay (depending upon the values of resistance 101 and capacitor 102) between the time that contacts 58 close to initiate reversal of motor 27 and the stepping of head 46 whereby the tape will have an opportunity to slow down to essentially zero velocity at the moment the head moves.

By virtue of the time constant established by the cooperation of capacitor 104 and the coil of relay 98, relay 98 remains energized by the foregoing circuit only long enough to establish a holding circuit. The holding circuit may be traced via leads 92, 93 and brushes 94 as effected by momentary rotation of disc 87. Thus, relay 98 is energized via capacitor 104 sufficiently to rotate disc 87 slightly to a point where brushes 94 are coupled by an associate one of conductive pads 91. At that time, relay 98 is held energized by a circuit traced from power supply 59, leads 97, 92, brushes 94, lead 93, relay 98, and return to the power supply via leads 107, 108 and contacts 58, then closed.

By the time the next insulated radial spacing 96 decouples leads 92, 93 (via brushes 94), the voltage of capacitor 104 will have been discharged by resistor 105 to a level below the hold-in voltage required by relay 98. Thus, relay 98 will open, halting the rotation of disc 87, completing the head stepping cycle.

Having in mind the foregoing description of the schematic arrangements shown in the above mentioned drawings, there is provided a detailed construction as shown in FIGURES 2 through 5 as now to be described.

A base plate or platform 111 supplies a supporting framework for the transport apparatus as well as providing a housing for associated electronics and control circuitry for the operation thereof. A drive capstan 112 includes flanges 113, 114 one of which is preferably resiliently urged by a suitable diaphragm (not shown) toward the other, the latter being fixed to capstan 112. Preferably, the bottom flange is fixed and the top flange movable. Capstan 112 is formed with a resilient drum surface and is mounted for rotation with its shaft 116. Shaft 116 is driven by a suitable motor carried within a base block 117.

Carriage assemblies 118, 119 are supported for movement between advanced and retracted positions with respect to the periphery of capstan 112 and are supported upon ways consisting of pairs of rods 121, 122 supported from base block 117 and clamped thereto by means of a screw 123 adapted to compress a slotted sleeve portion 124 of base block 117.

Inasmuch as carriages 118, 119 are identical, only carriage 118 will be described hereinafter.

Carriage 118 includes a journal body 126 serving to support an axle 127 for rotation therein. At the upper end of axle 127, means (not shown) have been provided to cooperate with a hold-down knob 128 adapted to be screwed down tightly thereagainst whereby a resilient O-ring 129 can be compressed into engagement between knob 128 and the hub 131 of a supply roll of tape 132.

Carriage assembly 118 further includes a skirt portion 133 formed to extend outwardly from journal body 126. Skirt portion 133 is formed integrally, as a casting, for example, with journal body 126 and includes an upwardly extending tab portion 134 which serves to carry a roller 136 adapted to ride along the upper surface of rod 122.

Another roller 137 is carried in opposed relation to roll along the underside of rod 122 and is spring loaded by means of a leaf spring 138. Spring 138 is connected at its rear end to the underside of journal body 126 and at its near end (as viewed in FIGURE 4) to a roller support block 139 which carries roller 137. Thus, roller 137 bears resiliently against the underside of rod 122.

The forward end of carriage assembly 118 is arranged to slidably roll along rod 122. The rear of carriage assembly 118 is slidably supported to move along rod 121 by means of a ball bushing 141. Bushing 141 is carried within a slotted portion of the assembly whereby upstanding ears 142, arranged in opposed relation, can be drawn together by means of threaded studs 143.

An elongated helical "bias" spring 144 is anchored at its opposite ends by means of screws 146 whereby carriages 118, 119 are drawn with equal force toward the resilient periphery of capstan 112. Spring 144 is arranged whereby the equal forces applied by it can be momentarily increased. Spring 144 is trained about a pair of stationary pulleys 145 to form a bight or bridle portion engaged by a movable pulley 115 carried by the extension 120 of the armature of a solenoid 47. The armature carries a fixed stop 130 which serves to limit its inward travel when solenoid 47 is energized. Contacts 135 (FIGURE 5) are aligned in the path of the inner end of the armature of solenoid 47 to become closed when it has been substantially fully energized. As noted above, the operation of solenoid 47 is under control of microswitches, such as microswitches 140, which become closed upon contact with the adjustable stops 150 carried by carriage assemblies 118, 119, respectively.

The compressive force acting upon capstan 112 at the point of tape arrival thereupon and point of tape departure therefrom as normally applied by bias spring 144 during tape transfer is varied or modulated by means, now to be described, for introducing a component of force at such points whereby the component of force acts at both points in a direction opposite to the direction of carriage movement of both carriages 118, 119. Accordingly, a first slip band 147 includes strand 148 and spring 149. One end of slip band 147 is fastened to one of the ears 142 of carriage assembly 118 and then trained about a pulley 151 supported for rotation at the upper end of a post 152 clamped in fixed position to the end of rod 121. Slip band 147 then leads around shaft 116 in a direction opposite to the direction of rotation thereof when driving capstan 112 in a direction which feeds tape from the supply roll formed upon hub 131. Slip band 147 then leads back to a carriage assembly 118 and is anchored by means of a screw 153 at the side of journal body 126.

Similarly a second slip band 157 comprised of a strand 158 and a spring 159 is trained about pulley 161 mounted upon post 162 and secured by a screw 163 to the side of the journal body of assembly 119.

A magnetic recording transducer 164 is supported to cooperate with tape being transferred from the supply roll to the take-up roll. Transducer 164 is arranged whereby it can be moved laterally of the direction of movement of tape 132 as tape 132 is carried around capstan 112. Transducer 164 is also arranged to be selectively withdrawn out of engagement with the peripheral surface of capstan 112.

Thus, a transducer support assembly 166 as now to be described is supported for movement upon spaced parallel rods 167, 168 extending vertically upwardly from, and secured in, base block 117. A ball bushing 169 is carried within a sleeve portion 171 whereby the carriage portion 172 of assembly 166 is slidably movable along rod 167. A spring 173 (FIGURE 4) serves to urge carriage portion 172 (and a cam follower portion thereof which is not shown) to cooperate with an eccentric 86.

Eccentric 86 is carried upon an axle journalled in base block 117. Transducer support assembly 166 is moved upwardly and downwardly upon rotation of eccentric 86.

Means are provided for rotating eccentric 86 which include a pinion drive motor 88 having a shaft 177 journalled in a bushing 178 carried on a protective front plate 179. A pinion 181 rotates with rotation of shaft 177 to drive a commutator disc 87 of relatively large diameter carried upon the axle 183 which supports eccentric 86. Accordingly, the rotary drive movement of motor 88 is considerably reduced by the foregoing gear reduction means whereby transducer 164 is moved only slightly for each increment of rotational displacement of disc 87 whereby any one of a number of given track positions on tape 132 can cooperate for playing or recording.

Brushes 94 are aligned to lie on a common radius of disc 87 whereby they will simultaneously arrive at those radii defining the insulated spacings 96 on disc 87, as previously described (FIGURE 1).

As explained above, transducer support assembly 166 is arranged to slide along one rod 167 by means of the ball bushing 169. Assembly 166 also slides along the other rod 168 by means of a pair of opposed rollers 184, 186. One roller, 186, is supported upon a fixed post secured to carriage portion 172. The other roller, 184, is resiliently urged toward roller 186 whereby roller 184 yieldingly bears against rod 168 by means of a leaf spring support (not shown) extending between carriage portion 172 and a roller support block 187.

Transducer 164 is embodied in a transducer subassembly 188 disposed in appropriate registration by means of reference pins 189 carried by carriage portion 172.

Means are provided whereby transducer 164 can be selectively withdrawn out of engagement with the resilient drum periphery of capstan 112 as desired. Thus, a knob 191 is connected by a stem 192 to rotate a cam 193 whereby a cam follower 194, connected to transducer carriage portion 172, is moved clockwise about the axis of rod 167 against the resilient urging of roller 184 bearing against rod 168.

Briefly, the operation of apparatus as shown herein proceeds generally as follows:

A roll of tape 132 is secured to rotate with axle 127 by means of holddown knob 128. A leading portion of tape 132 is pressed between and drawn by edgewise engagement between flanges 113, 114 whereby the leading portion of the tape is carried around capstan 112 past transducer 164 (then in its withdrawn position, as effected by appropriate rotation of knob 191). The leading portion of tape 132 continues around capstan 112 until it is pressed against the periphery of the take-up hub. The latter is then rotated along with the capstan and supply roll to apply several convolutions to the take-up hub.

As the take-up roll increases in diameter, the supply roll decreases in diameter and accordingly during tape transfer, take-up carriage 119 will proceed away from capstan 112 as supply carriage 118 proceeds toward capstan 112. Meanwhile, during transfer of the roll of tape, a greater compressive force is applied at the point of tape departure from capstan 112 than is applied at the point of tape arrival thereto. This is accomplished by means of the slip bands 147, 157 acting in conjunction with the bias spring 144.

While the performance of the system relative to tape reversal, temporary application of greater pressure to the tape, head positioning to various tracks, etc., has been previously explained, it will be evident from the foregoing detailed explanation, that the described apparatus provide a method of recording a program upon a recording tape whereby notwithstanding reversals of the tape during continuing playback, no program interruption noticeable to the eye or ear will intervene.

The method, therefore, includes the steps of feeding a length of pliable recording tape longitudinally in a first direction while recording in a first path, or track, therealong electrical signals constituting a first portion of the program being recorded. The next step is to reverse the feeding of the tape while continuing to so record the program. The duration of that period required for reversal is deliberately limited to a period on the order of the period of persistence of the human sense intended for the reproduced signals. The tape is then fed in a second direction while recording in a second path those electrical signals representative of a second portion of the program. As noted above, in order to carry out the step of limiting the duration of the period required for reversal to a period on the order of the period of persistence of the human sense intended for the reproduced signal the step shall be executed in a period of time which, in general, shall not normally substantially exceed one second.

From the foregoing method it will be readily evident that there is produced a record comprising a recorded program disposed on an elongated pliable filament such as a magnetic recording tape or photographic film adapted to be fed relative to a transducer at transducing speed to reproduce the program for presentation to the human senses. The record comprises a length of tape and a plurality of recording tracks extending along the tape. A first program portion in the form of electric signal representations is disposed along one of the tracks in one direction and a second program portion in the form of recorded electric signals is distributed along another of the tracks in a direction opposite to the direction of the first named track. The first and second program portions form a program adapted to be free of apparent interruption between the end of the first program portion and the start of the second portion when the tape is fed at transducing speed. ("Direction" is defined by the ray extending between first and last information indicia or signal representations recorded in a given recording track.)

What is claimed is:

1. In a tape transport of a type adapted to support a length of pliable tape wrapped to form supply and take-up rolls and having means for rotatably supporting each of the rolls and drive means comprising annular rotating means having arcuate surface portions for contacting tape and transferring same from the supply to the take-up roll through points of contact with said tape, apparatus for controlling the tape during rapidly varying rates of change of the speed thereof comprising means for rapidly changing the speed of said rotating means to vary the speed of said tape, means serving to instruct the last named means to so change the speed, and means operatively responsive to the instructing means for increasing the pressure applied at said points of contact with said tape immediately prior to and during such speed change.

2. In a tape transport of a type adapted to support a length of pliable tape wrapped to form supply and take-up rolls, and having means for rotatably suporting each of the rolls and drive means comprising annular rotating means having arcuate surface portions for contacting and rotating the supply and take-up rolls through points of contact with said rolls, apparatus for controlling the tape during rapidly varying rates of change of the speed thereof comprising means for rapidly changing the speed of said rotating means to vary the rotational speed of said rolls, means serving to instruct the last named means to so change the speed, and means operatively responsive to the instructing means for increasing the contact pressure between said rolls and said surface portions immediately prior to and during such speed changes.

3. Tape transport apparatus according to claim 2 wherein said means for rapidly changing the speed of the rotating means include reversing means serving to reverse the rotation of said drive means within a period not substantially exceeding one second thereby rapidly changing the speed.

4. A tape transport of a type adapted to support a length of pliable recording tape wrapped to form supply and take-up rolls comprising means for rotatably supporting each of said rolls, drive means for feeding tape from such supply roll to the take-up roll, said drive means comprising annular rotating means having resilient arcuate surface portions adapted to contact and rotate the supply and take-up rolls, the points of contact with said supply and take-up rolls respectively being first and second points of contact when feeding tape from the supply to the take-up roll, means active during transfer of tape from said supply to said take-up roll for developing a compressive force between the supply roll and the cooperating arcuate surface portion at said first point of contact and between the take-up roll and the cooperating arcuate surface portion at said second point of contact, the compressive force being greater at said second point of contact, means for rapidly changing the speed of said rotating means to vary the rotational speed of said rolls, means serving to instruct the last named means to so change the speed, and means operatively responsive to the instructing means for applying said compressive forces at increased levels during said change in speed.

5. In a tape transport of the type adapted to support a length of pliable recording tape wrapped to form supply and take-up rolls apparatus comprising means for rotatably supporting each of said rolls for rotation about their respective axes, reversible drive means adapted to support and feed tape from such supply roll to the take-up roll and return, said drive means including a capstan rotatable in opposite directions and adapted to contact said supply and take-up rolls in edge driving relation therewith, carriage means for supporting the axes of said rolls to be independtly movable laterally relative to said capstan to maintain contact between the capstan and said rolls during transfer of the tape between said rolls, transducer means disposed to cooperate with said tape and adapted to transduce a control signal for directing the reversal of the transfer of the tape, switch means operatively responsive to the lateral movement of one of said axes at a predetermined point in the travel thereof and operatively coupled to said transducer means to initiate recording of said control signal and reversal of said drive means and to maintain the recordation of said control signal until the drive means has been reversed for a period sufficient to provide retreating lateral movement of said one axis substantially to said predetermined point.

References Cited

UNITED STATES PATENTS

| | | | |
|---|---|---|---|
| 2,254,478 | 9/1941 | Fodor | 179—100.3 |
| 2,408,293 | 9/1946 | Carmel | 179—100.3 X |
| 3,370,804 | 2/1968 | Peyton | 242—55.12 |

STANLEY M. URYNOWICZ, Jr., Primary Examiner

R. F. CARDILLO, Jr., Assistant Examiner

U.S. Cl. X.R.

242—55.12

UNITED STATES PATENT OFFICE
CERTIFICATE OF CORRECTION

Patent No. 3,487,175 Dated December 30, 1969

Inventor(s) Chester W. Newell

It is certified that error appears in the above-identified patent and that said Letters Patent are hereby corrected as shown below:

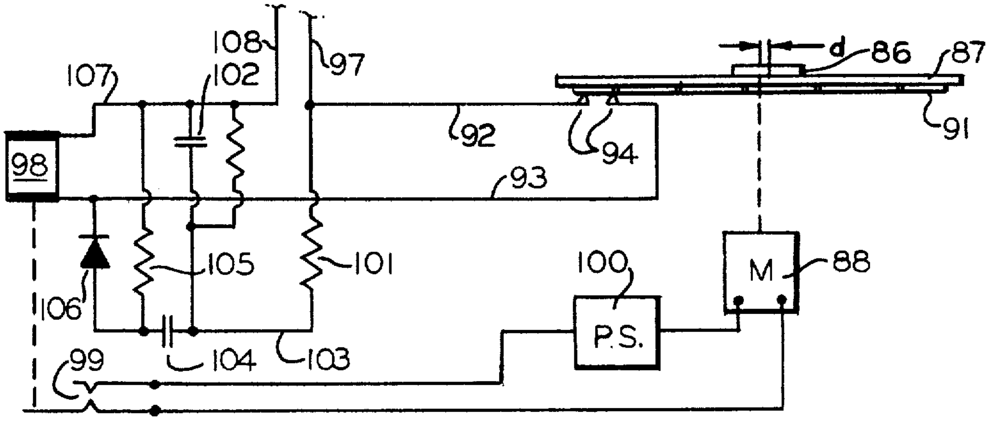

FIG. 1

SIGNED AND SEALED
SEP 22 1970

(SEAL)
Attest:

Edward M. Fletcher, Jr.
Attesting Officer

WILLIAM E. SCHUYLER, JR.
Commissioner of Patents